US012807510B2

(12) United States Patent
Liu et al.

(10) Patent No.: US 12,807,510 B2
(45) Date of Patent: Nov. 24, 2026

(54) CONTINUOUS REACTION SYSTEM, FERROMANGANESE PHOSPHATE PRECURSOR, LITHIUM IRON MANGANESE PHOSPHATE, PREPARATION METHOD, AND SECONDARY BATTERY

(71) Applicant: CONTEMPORARY AMPEREX TECHNOLOGY (HONG KONG) LIMITED, Hong Kong (CN)

(72) Inventors: Shaojun Liu, Ningde (CN); Wenwei Zhan, Ningde (CN); Xinxin Zhang, Ningde (CN); Chuying Ouyang, Ningde (CN); Qingzheng Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 234 days.

(21) Appl. No.: 18/636,290

(22) Filed: Apr. 16, 2024

(65) Prior Publication Data

US 2024/0254005 A1 Aug. 1, 2024

Related U.S. Application Data

(63) Continuation of application No. PCT/CN2022/106090, filed on Jul. 15, 2022.

(51) Int. Cl.
*H01M 4/136* (2010.01)
*C01B 25/45* (2006.01)
(Continued)

(52) U.S. Cl.
CPC ........ *C01G 49/009* (2013.01); *C01P 2002/72* (2013.01); *C01P 2004/03* (2013.01);
(Continued)

(58) Field of Classification Search
CPC ............... C01G 49/009; C01P 2002/72; C01P 2004/03; C01P 2004/32; C01P 2004/51;
(Continued)

(56) References Cited

U.S. PATENT DOCUMENTS

| | | | | |
|---|---|---|---|---|
| 10,707,479 | B2 * | 7/2020 | Forbert | H01M 4/136 |
| 12,162,752 | B2 * | 12/2024 | Liang | C01B 25/306 |
| 2017/0110731 | A1 * | 4/2017 | Sun | H01M 10/0569 |

FOREIGN PATENT DOCUMENTS

| | | |
|---|---|---|
| CN | 203781852 U | 8/2014 |
| CN | 105244497 A | 1/2016 |

(Continued)

OTHER PUBLICATIONS

International Search Report received in the corresponding international application PCT/CN2022/106090, mailed on Jan. 6, 2023.

(Continued)

*Primary Examiner* — Cam N. Nguyen
(74) *Attorney, Agent, or Firm* — K&L Gates LLP

(57) ABSTRACT

The present application provides a continuous reaction system, a ferromanganese phosphate precursor, a lithium iron manganese phosphate, a preparation method, and a secondary battery. A method for preparing a ferromanganese phosphate precursor provided in the present application is a continuous preparation method, thereby improving the production efficiency, and obtaining the ferromanganese phosphate precursor with small particle size, narrow particle size distribution, high crystallinity, monocrystal phase, regular appearance, high tap density, high batch stability, and high batch consistency.

16 Claims, 2 Drawing Sheets

(51) Int. Cl.
*C01G 49/00* (2006.01)
*H01M 4/1397* (2010.01)
*H01M 10/052* (2010.01)
*H01M 10/0525* (2010.01)

(52) U.S. Cl.
CPC ...... *C01P 2004/32* (2013.01); *C01P 2004/51* (2013.01); *C01P 2004/61* (2013.01)

(58) Field of Classification Search
CPC ............ C01P 2004/61; C01P 2006/14; H01M 4/136; H01M 4/1397; H01M 10/0525; H01M 2004/028; H01M 4/5825; H01M 10/052; C01B 25/45; Y02E 60/10
USPC ........................................................ 423/594.2
See application file for complete search history.

(56) References Cited

FOREIGN PATENT DOCUMENTS

| | | | |
|---|---|---|---|
| CN | 105449207 | A | 3/2016 |
| CN | 106025203 | A | 10/2016 |
| CN | 106848309 | A | 6/2017 |
| CN | 107337189 | A | 11/2017 |
| CN | 107337189 | B | 9/2019 |
| CN | 106981656 | B | 12/2019 |
| CN | 111908442 | A | 11/2020 |
| CN | 113387400 | A | 9/2021 |
| CN | 113942990 | A | 1/2022 |
| CN | 114057177 | A | 2/2022 |
| CN | 109250698 | B | 5/2022 |
| CN | 114644328 | A | 6/2022 |
| JP | 2014029863 | A | 2/2014 |
| JP | 2022512318 | A | 2/2022 |
| WO | 2015139526 | A1 | 9/2015 |
| WO | 2020126343 | A1 | 6/2020 |
| WO | 2023184960 | A1 | 10/2023 |

OTHER PUBLICATIONS

The extended European search report received in the counterpart EP application 22950744.7, mailed on May 2, 2025, 8 pages.
The Notice of Reasons for Refusal received in the counterpart JP application 2024-503350, mailed on Feb. 25, 2025, 14 pages with English translation.

* cited by examiner

CONTINUOUS REACTION SYSTEM, FERROMANGANESE PHOSPHATE PRECURSOR, LITHIUM IRON MANGANESE PHOSPHATE, PREPARATION METHOD, AND SECONDARY BATTERY

CROSS REFERENCE TO RELATED MATTER

This application is a continuation of international application PCT/CN2022/106090, filed Jul. 15, 2022 and entitled "CONTINUOUS REACTION SYSTEM, FERROMANGANESE PHOSPHATE PRECURSOR, LITHIUM IRON MANGANESE PHOSPHATE, PREPARATION METHOD, AND SECONDARY BATTERY", the entire content of which is hereby incorporated by reference in its entirety.

TECHNICAL FIELD

The present application belongs to the technical field of batteries, and specifically relates to a continuous reaction system, a ferromanganese phosphate precursor, a lithium iron manganese phosphate, a preparation method, and a secondary battery.

BACKGROUND

In recent years, secondary batteries are widely applied in energy storage power systems, such as water, fire, wind, and solar power stations, as well as many fields, such as electric tools, electric bicycles, electric motorcycles, electric vehicles, military equipment, and aerospace. With the application and promotion of the secondary batteries, their safety performance has attracted more and more attention. Because of having advantages such as high capacity, good safety performance, and abundant sources of raw materials, a lithium iron manganese phosphate has become one of the positive electrode active materials attracting greatest attention at present. A ferromanganese phosphate is one of the important raw materials for preparing the lithium iron manganese phosphate, because its performance is crucial to performance of the lithium iron manganese phosphate and the secondary batteries. However, at present, the ferromanganese phosphate is obtained by an intermittent preparation method, which has problems such as low production efficiency, complex process, uncontrollable production process, large product quality fluctuation, poor batch stability, and poor batch consistency.

SUMMARY OF THE INVENTION

An object of the present application is to provide a continuous reaction system, a ferromanganese phosphate precursor, a lithium iron manganese phosphate, a preparation method, and a secondary battery, so as to improve the production efficiency of the ferromanganese phosphate precursor, and obtain the ferromanganese phosphate precursor with small particle size, narrow particle size distribution, high crystallinity, monocrystal phase, regular appearance, high tap density, high batch stability, and high batch consistency.

A first aspect of the present application provides a continuous reaction system for preparing a ferromanganese phosphate precursor, including a first dissolution reactor, a second dissolution reactor, a first reactor, a second reactor, and an aging reactor; where the first reactor, the second reactor, and the aging reactor are sequentially connected in series through pipelines; the first dissolution reactor is configured to accommodate a metal salt solution required for preparing the ferromanganese phosphate precursor, and the second dissolution reactor is configured to accommodate an oxidant and a phosphorus source solution required for preparing the ferromanganese phosphate precursor; the first reactor includes a first feed port and a first overflow port, the first feed port of the first reactor is interconnected to the first dissolution reactor through a first pipeline and interconnected to the second dissolution reactor through a second pipeline, so that the first reactor accommodates the metal salt solution and the phosphorus source solution, and allows the metal salt solution and the phosphorus source solution to be mixed for reaction to generate a first reaction mixture, the first pipeline is provided with a first stop valve and a first metering pump to regulate a flow rate of the metal salt solution, and the second pipeline is provided with a second stop valve and a second metering pump to regulate a flow rate of the phosphorus source solution; the second reactor includes a second feed port and a second overflow port, and the second feed port of the second reactor is interconnected to the first overflow port of the first reactor through a third pipeline, so that the second reactor accommodates the first reaction mixture from the first reactor and allows the first reaction mixture to continue reaction to generate a second reaction mixture; the aging reactor includes a third feed port and a third overflow port, and the third feed port of the aging reactor is interconnected to the second overflow port of the second reactor through a fourth pipeline, so that the aging reactor accommodates the second reaction mixture from the second reactor and allows the second reaction mixture to continue reaction to generate a third reaction mixture; and when a liquid level of the third reaction mixture is higher than the third overflow port of the aging reactor, the third reaction mixture flows out through the third overflow port of the aging reactor.

A second aspect of the present application provides a method for preparing a ferromanganese phosphate precursor, at least including steps of: S1: connecting a first reactor, a second reactor, and an aging reactor in series through pipelines, where the first reactor includes a first feed port and a first overflow port, the first feed port of the first reactor is interconnected to a first dissolution reactor through a first pipeline, the first feed port of the first reactor is interconnected to a second dissolution reactor through a second pipeline, the first pipeline is provided with a first stop valve and a first metering pump, the second pipeline is provided with a second stop valve and a second metering pump, the second reactor includes a second feed port and a second overflow port, the second feed port of the second reactor is interconnected to the first overflow port of the first reactor through a third pipeline, the aging reactor includes a third feed port and a third overflow port, and the third feed port of the aging reactor is interconnected to the second overflow port of the second reactor through a fourth pipeline; S2: adding a metal salt solution required for preparing the ferromanganese phosphate precursor into the first dissolution reactor, adding an oxidant and a phosphorus source solution required for preparing the ferromanganese phosphate precursor into the second dissolution reactor, pumping the metal salt solution in the first dissolution reactor into the first pipeline through the first stop valve and the first metering pump, pumping the phosphorus source solution in the second dissolution reactor into the second pipeline through the second stop valve and the second metering pump, allowing the metal salt solution and the phosphorus source solution to be mixed in the first reactor for reaction to generate a first reaction mixture, automatically transporting, when a liquid level of the first reaction mixture is higher than the first overflow port of the first reactor, the first reaction mixture to the second reactor for further reaction to generate a second reaction mixture, and automatically transporting, when a liquid level of the second reaction mixture is higher than the second overflow port of the second reactor, the second reaction mixture to the aging reactor for further reaction to generate a third reaction mixture, where, when a liquid level of the third reaction mixture is higher than the third overflow port of the aging reactor, the third reaction mixture automatically flows out through the third overflow port of the aging reactor, and during the reaction, the first dissolution reactor, the second dissolution reactor, the first reactor, the second reactor, and the aging reactor are each in a protective gas atmosphere, and each remains stirred, where the protective gas optionally includes nitrogen, an inert gas, or a combination thereof; and S3: filtering, washing, and drying the third reaction mixture obtained through the third overflow port of the aging reactor to obtain the ferromanganese phosphate precursor.

The method for preparing a ferromanganese phosphate precursor provided in the present application has advantages such as high production efficiency, high energy efficiency, simple process, easy operations, and low labor costs, and is especially suitable for large-scale industrial production. The method for preparing a ferromanganese phosphate precursor provided in the present application is a continuous preparation method, and the ferromanganese phosphate precursor obtained through the continuous preparation method provided in the present application has advantages of small particle size, narrow particle size distribution, high crystallinity, monocrystal phase, regular appearance, high tap density, high batch stability, and high batch consistency. The method for preparing a ferromanganese phosphate precursor provided in the present application can further control the growth speed of crystal particles and regulate the size and appearance of the crystal particles, thereby satisfying different production requirements to facilitate the preparation of the lithium iron manganese phosphate with different particle sizes.

In any embodiment of the present application, a complexing agent is also added into the first dissolution reactor; optionally, the complexing agent includes one or more of an aminocarboxylate, a hydroxycarboxylate, and an organic phosphonate; and more optionally, the complexing agent includes one or more of sodium ammonium triacetate, disodium ethylenediamine tetraacetate, sodium gluconate, and sodium citrate, thereby obtaining spherical ferromanganese phosphate precursor particles with high purity, uniform metal element distribution, and high tap density; and accurately controlling metal element contents.

In any embodiment of the present application, a surfactant is also added into the first dissolution reactor, and optionally, the surfactant includes one or more of cetyltrimethylammonium bromide, sodium dodecanesulfonate, and polyvinylpyrrolidone, thereby contributing to better regulating the appearance of the ferromanganese phosphate precursor particles.

In any embodiment of the present application, a reaction temperature in the first reactor is lower than a reaction temperature in the second reactor, and a reaction temperature in the aging reactor is lower than the reaction temperature in the second reactor, thereby not only regulating a particle size of the resulting ferromanganese phosphate precursor, but also contributing to obtaining the ferromanganese phosphate precursor particles with narrow particle size distribution, high crystallinity, monocrystal phase, regular appearance, and high tap density.

In any embodiment of the present application, the reaction temperature in the first reactor is from 70° C. to 90° C.

In any embodiment of the present application, the reaction temperature in the second reactor is from 150° C. to 250° C.

In any embodiment of the present application, the reaction temperature in the aging reactor is from 20° C. to 30° C.

In any embodiment of the present application, a flow rate of the metal salt solution in the first pipeline is from 0.2 L/min to 2 L/min, and is optionally from 0.25 L/min to 1 L/min.

In any embodiment of the present application, a flow rate of the phosphorus source solution in the second pipeline is from 0.2 L/min to 2 L/min, and is optionally from 0.25 L/min to 1 L/min.

In any embodiment of the present application, the flow rate of the metal salt solution is equal to the flow rate of the phosphorus source solution, thereby contributing to improving the consistency of the resulting ferromanganese phosphate precursor particles.

In any embodiment of the present application, a residence time of the ferromanganese phosphate precursor in the first reactor during growth is from 1 h to 4 h.

In any embodiment of the present application, a residence time of the ferromanganese phosphate precursor in the second reactor during growth is from 1 h to 16 h, and is optionally from 4 h to 16 h.

In any embodiment of the present application, a residence time of the ferromanganese phosphate precursor in the aging reactor during growth is from 1 h to 48 h, and is optionally from 12 h to 48 h.

In any embodiment of the present application, a volume of the first reactor is less than or equal to a volume of the second reactor; and a ratio of the volume of the first reactor to the volume of the second reactor is optionally 1:(1-4), and is more optionally 1:(2-4), so that the resulting ferromanganese phosphate precursor particles have higher crystallinity.

In any embodiment of the present application, the volume of the first reactor is less than or equal to a volume of the aging reactor; and a ratio of the volume of the first reactor to the volume of the aging reactor is optionally 1:(1-12), and is more optionally 1:(4-12), so that the resulting ferromanganese phosphate precursor has a large particle size.

In any embodiment of the present application, the volume of the second reactor is less than or equal to the volume of the aging reactor; and a ratio of the volume of the second reactor to the volume of the aging reactor is optionally 1:(1-3), and is more optionally 1:(2-3). so that the resulting ferromanganese phosphate precursor has a large particle size.

In any embodiment of the present application, the metal salt required for preparing the ferromanganese phosphate precursor includes a water-soluble iron salt, a water-soluble manganese salt, and an optional water-soluble salt of a doping element M, where M represents a manganese-doped and iron-doped element, optionally including one or more of Co, Mg, Zn, Ca, Ti, V, Ni, or Cr.

In any embodiment of the present application, the water-soluble iron salt includes one or more of ferrous chloride, ferrous nitrate, ferrous sulfate, ferrous acetate, ferric chloride, ferric nitrate, ferric sulfate, or ferric acetate.

In any embodiment of the present application, the water-soluble manganese salt includes one or more of manganous chloride, manganous nitrate, manganous sulfate, or manganous acetate.

In any embodiment of the present application, the water-soluble salt of the doping element M includes one or more of a chloride, a nitrate, a sulfate, or an acetate of the doping element M.

In any embodiment of the present application, the phosphorus source required for preparing the ferromanganese phosphate precursor includes one or more of phosphoric acid or a water-soluble phosphate, and optionally, the water-soluble phosphate includes one or more of trisodium phosphate, tripotassium phosphate, ammonium monohydrogen phosphate, ammonium dihydrogen phosphate, and triammonium phosphate.

In any embodiment of the present application, the phosphorus source required for preparing the ferromanganese phosphate precursor further includes a water-soluble source of a doping element Q, where Q represents a phosphorus-doped element, optionally including one or more of B, S, Si, and N. Optionally, the source of the doping element Q includes one or more of a sulfate, a borate, a nitrate, or a silicate of the doping element Q.

In any embodiment of the present application, the oxidant includes one or more of hydrogen peroxide, nitric acid, sodium hypochlorite, potassium hypochlorite, sodium chlorate, and potassium chlorate, and is optionally hydrogen peroxide.

In any embodiment of the present application, a molar ratio of the metal salt to the oxidant is 1:(0.1-1.2), and is optionally 1:(0.5-0.6).

In any embodiment of the present application, a concentration of the metal salt solution is from 0.5 mol/L to 2 mol/L, and is optionally from 0.5 mol/L to 1 mol/L.

In any embodiment of the present application, a concentration of the phosphorus source solution is from 0.5 mol/L to 2 mol/L, and is optionally from 0.5 mol/L to 1 mol/L.

In any embodiment of the present application, a molar ratio of the metal salt to the phosphorus source is from 1:1 to 1:3.

In any embodiment of the present application, a stirring speed in the first dissolution reactor is from 100 r/min to 500 r/min.

In any embodiment of the present application, a stirring speed in the second dissolution reactor is from 100 r/min to 500 r/min.

In any embodiment of the present application, a stirring speed in the first reactor is from 100 r/min to 500 r/min.

In any embodiment of the present application, a stirring speed in the second reactor is from 100 r/min to 500 r/min.

In any embodiment of the present application, a stirring speed in the aging reactor is from 100 r/min to 500 r/min.

In any embodiment of the present application, in S3, a drying temperature is from 200° C. to 300° C.

In any embodiment of the present application, in S3, a drying duration is from 3 h to 8 h.

In any embodiment of the present application, in S3, a drying atmosphere is a protective gas atmosphere, where the protective gas includes nitrogen, an inert gas, or a combination thereof.

The third aspect of the present application provides a ferromanganese phosphate precursor prepared through the preparation method in the second aspect of the present application, having a chemical formula $Fe_xMn_yM_{1-x-y}P_{1-m}Q_mO_4$, $0<x<1$, optionally $0.2 \leq x \leq 0.5$, $0<y<1$, optionally $0.5 \leq y \leq 0.8$ and $0 \leq 1-x-y<1$, optionally $0<1-x-y \leq 0.05$ and $0 \leq m \leq 0.1$, and optionally $0<m \leq 0.05$, where M represents a manganese-doped and iron-doped element, optionally including one or more of Co, Mg, Zn, Ca, Ti, V, Ni, or Cr, Q represents a phosphorus-doped element, optionally including one or more of B, S, Si, and N, and the ferromanganese phosphate precursor is electroneutral.

The ferromanganese phosphate precursor provided in the present application has advantages of small particle size, narrow particle size distribution, high crystallinity, monocrystal phase, regular appearance, high tap density, high batch stability, and high batch consistency.

In any embodiment of the present application, the ferromanganese phosphate precursor has a spherical appearance.

In any embodiment of the present application, the ferromanganese phosphate precursor is an orthorhombic crystal system with a space group of pmnb.

In any embodiment of the present application, volumetric particle sizes Dv90 and Dv50 of the ferromanganese phosphate precursor satisfy $1<Dv90/Dv50 \leq 2$, and optionally $1.1 \leq Dv90/Dv50 \leq 1.7$.

In any embodiment of the present application, the volumetric particle size Dv50 of the ferromanganese phosphate precursor is from 1 μm to 10 μm, and is optionally from 2.5 μm to 6 μm.

The fourth aspect of the present application provides a method for preparing a lithium iron manganese phosphate, at least including steps of: S10: sufficiently mixing the ferromanganese phosphate precursor prepared through the preparation method in the second aspect of the present application or the ferromanganese phosphate precursor in the third aspect of the present application with a lithium source, an optional source of a doping element N, and an optional source of a doping element R at a predetermined ratio to obtain mixed raw materials, where N represents a lithium-doped element, optionally including one or more of Zn, Al, Na, K, Mg, Nb, Mo, and W, and R represents an oxygen-doped element, optionally including one or more of S, F, Cl, and Br; and S20: sintering the mixed raw materials obtained in S10 to obtain the lithium iron manganese phosphate, where the lithium iron manganese phosphate has a chemical formula $Li_aN_bFe_xMn_yM_{1-x-y}P_{1-m}Q_mO_{4-n}R_n$, M represents a manganese-doped and iron-doped element, optionally including one or more of Co, Mg, Zn, Ca, Ti, V, Ni, or Cr, N represents a lithium-doped element, optionally including one or more of Zn, Al, Na, K, Mg, Nb, Mo, and W, Q represents a phosphorus-doped element, optionally including one or more of B, S, Si, and N, R represents an oxygen-doped element, optionally including one or more of S, F, Cl, and Br, $0.9 \leq a \leq 1.1$, $0 \leq b \leq 0.1$, optionally $0<b \leq 0.05$ and $0<x<1$, optionally $0.25 \leq x \leq 0.5$ and $0<y<1$, optionally $0.5 \leq y \leq 0.8$ and $0 \leq 1-x-y<1$, optionally $0<1-x-y \leq 0.05$ and $0 \leq m \leq 0.1$, optionally $0<m \leq 0.05$ and $0 \leq n \leq 0.1$, and optionally $0<n \leq 0.05$, and the lithium iron manganese phosphate is electroneutral.

The above preparation method of the present application contributes to obtaining the lithium iron manganese phosphate with spherical appearance and uniform distribution of elements.

In any embodiment of the present application, in S10, a carbon source is also added into the mixed raw materials, so that a carbon-cladded lithium iron manganese phosphate can be prepared. In addition, the above preparation method of the present application contributes to forming a complete, uniform, and firm carbon cladding layer to improve conductivity of the resulting lithium iron manganese phosphate.

The fifth aspect of the present application provides a lithium iron manganese phosphate prepared through the preparation method in the fourth aspect of the present application, which can have excellent electrochemical performance.

The sixth aspect of the present application provides a secondary battery, comprising the lithium iron manganese phosphate prepared through the preparation method in the fourth aspect of the present application.

DESCRIPTION OF DRAWINGS

In order to more clearly illustrate the technical solutions in examples of the present application, the drawings to be used in the examples of the present application will be briefly introduced below. Apparently, the drawings described below are merely some embodiments of the present application. For those of ordinary skills in the art, other drawings may also be obtained based on these drawings without making creative work. In the drawings, the figures may not be drawn to the actual scale.

Figure 1:
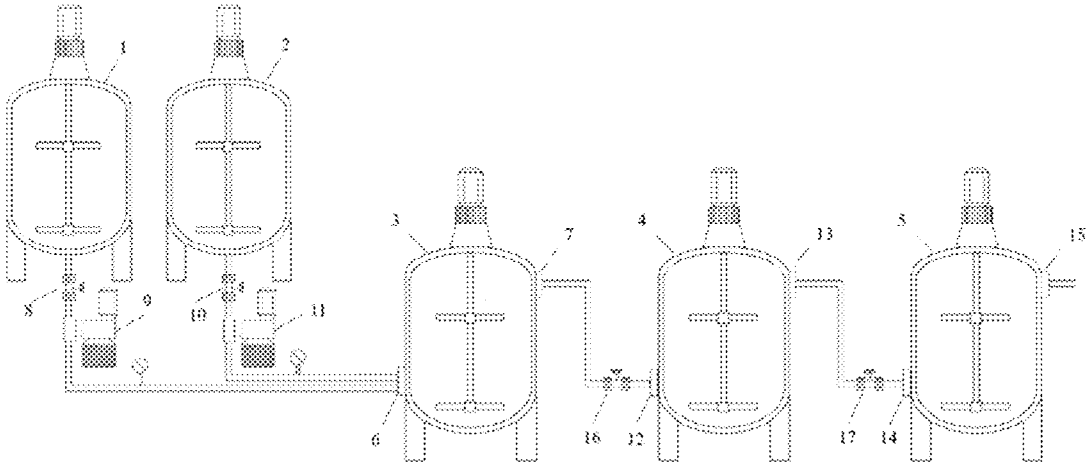
FIG. 1 shows a continuous reaction system for preparing a ferromanganese phosphate precursor.

Reference numerals are as follows: 1. first dissolution reactor; 2. second dissolution reactor; 3. first reactor; 4. second reactor; 5. aging reactor; 6. first feed port; 7. first overflow port; 8. first stop valve; 9. first metering pump; 10. second stop valve; 11. second metering pump; 12. second feed port; 13. second overflow port; 14. third feed port; 15. third overflow port; 16. third stop valve; and 17. fourth stop valve.

DETAILED DESCRIPTION

Embodiments of a continuous reaction system, a ferromanganese phosphate precursor, a lithium iron manganese phosphate, a preparation method, and a secondary battery of the present application are specifically disclosed below with appropriate reference to the drawings. However, there will be cases where unnecessary detailed descriptions are omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specifically stated, all embodiments and optional embodiments of the present application may be combined with each other to form new technical solutions, and such technical solutions should be considered as being included in the disclosure of the present application.

Unless otherwise specifically stated, all technical features and optional technical features of the present application may be combined with each other to form new technical solutions, and such technical solutions should be considered as being included in the disclosure of the present application.

Unless otherwise specifically stated, all steps in the present application may be performed sequentially or may be performed randomly, and are preferably performed sequentially. For example, the method includes steps S1 and S2, which means that the method may include sequentially performed steps S1 and S2, or may include sequentially performed steps S2 and S1. For example, the reference to the method may further include step S3, which means that step S3 may be added to the method in any order, for example, the method may include steps S1, S2, and S3, or may include steps S1, S3, and S2, or may include steps S3, S1, and S2, and so on.

Unless otherwise specifically stated, the terms "include/including" and "comprise/comprising" mentioned in the present application may be open-ended, or may be closed-ended. For example, the "including" and "comprising" may mean that other components that are not listed are further included or comprised, or only the listed components are included or comprised.

Unless otherwise specified, the term "or" is inclusive in the present application. By way of example, the phrase "A or B" means "A, B, or both A and B". More specifically, the condition "A or B" is satisfied under any one of the following conditions: A is true (or present) and B is false (or absent); A is false (or absent) and B is true (or present); or both A and B are true (or present).

Unless otherwise specifically stated, the terms such as "first," "second," and "third" in the present application are used to distinguish between different objects, and are not used to describe a specific sequence or a primary-secondary relationship.

The "plurality of" mentioned in the present application refers to two or more than two.

The first aspect of embodiments of the present application provides a continuous reaction system for preparing a ferromanganese phosphate precursor.

As shown in FIG. 1, the continuous reaction system includes a first dissolution reactor 1, a second dissolution reactor 2, a first reactor 3, a second reactor 4, and an aging reactor 5; where the first reactor 3, the second reactor 4, and the aging reactor 5 are sequentially connected in series through pipelines; the first dissolution reactor 1 is configured to accommodate a metal salt solution required for preparing the ferromanganese phosphate precursor, and the second dissolution reactor 2 is configured to accommodate an oxidant and a phosphorus source solution required for preparing the ferromanganese phosphate precursor; the first reactor 3 includes a first feed port 6 and a first overflow port 7, the first feed port 6 of the first reactor is interconnected to the first dissolution reactor 1 through a first pipeline and interconnected to the second dissolution reactor 2 through a second pipeline, so that the first reactor 3 accommodates the metal salt solution and the phosphorus source solution, and allows the metal salt solution and the phosphorus source solution to be mixed for reaction to generate a first reaction mixture, the first pipeline is provided with a first stop valve 8 and a first metering pump 9 to regulate a flow rate of the metal salt solution, and the second pipeline is provided with a second stop valve 10 and a second metering pump 11 to regulate a flow rate of the phosphorus source solution; the second reactor 4 includes a second feed port 12 and a second overflow port 13, and the second feed port 12 of the second reactor is interconnected to the first overflow port 7 of the first reactor through a third pipeline, so that the second reactor 4 accommodates the first reaction mixture from the first reactor 3 and allows the first reaction mixture to continue reaction to generate a second reaction mixture; the aging reactor 5 includes a third feed port 14 and a third overflow port 15, and the third feed port 14 of the aging reactor is interconnected to the second overflow port 13 of the second reactor through a fourth pipeline, so that the aging reactor 5 accommodates the second reaction mixture from the second reactor 4 and allows the second reaction mixture to continue reaction to generate a third reaction mixture; and when a liquid level of the third reaction mixture is higher than the third overflow port 15 of the aging reactor, the third reaction mixture flows out through the third overflow port 15 of the aging reactor.

In some examples, a stirring apparatus is provided in each of the first dissolution reactor 1, the second dissolution reactor 2, the first reactor 3, the second reactor 4, and the aging reactor 5.

In some examples, a heating apparatus may be further provided in the first reactor 3, the second reactor 4, and the aging reactor 5, so as to regulate the reaction temperature in each reactor as required.

In some examples, a third stop valve 16 is further provided on the third pipeline, and a fourth stop valve 17 is further provided on the fourth pipeline.

When the ferromanganese phosphate precursor is prepared, the first stop valve 8, the second stop valve 10, the third stop valve 16, and the fourth stop valve 17 can all be kept switched on, thereby ensuring continuous feeding and continuous discharging, and performing reactions in a plurality of reactors simultaneously.

The second aspect of embodiments of the present application provides a method for preparing a ferromanganese phosphate precursor through the continuous reaction system in the first aspect of the embodiments of the present application. As shown in FIG. 1, the method at least includes steps of:

S1: connecting a first reactor 3, a second reactor 4, and an aging reactor 5 in series through pipelines, where the first reactor 3 includes a first feed port 6 and a first overflow port 7, the first feed port 6 of the first reactor is interconnected to a first dissolution reactor 1 through a first pipeline, the first feed port 6 of the first reactor is interconnected to a second dissolution reactor 2 through a second pipeline, the first pipeline is provided with a first stop valve 8 and a first metering pump 9, the second pipeline is provided with a second stop valve 10 and a second metering pump 11, the second reactor 4 includes a second feed port 12 and a second overflow port 13, the second feed port 12 of the second reactor is interconnected to the first overflow port 7 of the first reactor through a third pipeline, the aging reactor 5 includes a third feed port 14 and a third overflow port 15, and the third feed port 14 of the aging reactor is interconnected to the second overflow port 13 of the second reactor through a fourth pipeline;

S2: adding a metal salt solution required for preparing the ferromanganese phosphate precursor into the first dissolution reactor 1, adding an oxidant and a phosphorus source solution required for preparing the ferromanganese phosphate precursor into the second dissolution reactor 2, pumping the metal salt solution in the first dissolution reactor 1 into the first pipeline through the first stop valve 8 and the first metering pump 9, pumping the phosphorus source solution in the second dissolution reactor 2 into the second pipeline through the second stop valve 10 and the second metering pump 11, allowing the metal salt solution and the phosphorus source solution to be mixed for reaction in the first reactor 3 to generate a first reaction mixture, automatically transporting, when a liquid level of the first reaction mixture is higher than the first overflow port 7 of the first reactor, the first reaction mixture to the second reactor 4 for further reaction to generate a second reaction mixture, and automatically transporting, when a liquid level of the second reaction mixture is higher than the second overflow port 13 of the second reactor, the second reaction mixture to the aging reactor 5 for further reaction to generate a third reaction mixture, where, when a liquid level of the third reaction mixture is higher than the third overflow port 15 of the aging reactor, the third reaction mixture automatically flows out through the third overflow port 15 of the aging reactor, and during the reaction, the first dissolution reactor 1, the second dissolution reactor 2, the first reactor 3, the second reactor 4, and the aging reactor 5 are each in a protective gas atmosphere, and each remains stirred; and S3: filtering, washing, and drying the third reaction mixture obtained through the third overflow port 15 of the aging reactor to obtain the ferromanganese phosphate precursor.

Existing reaction systems for preparing a ferromanganese phosphate precursor mostly adopt an intermittent production process of a single reactor or a plurality of parallel-connected reactors, thereby having a defect of a low production efficiency, and when a plurality of parallel-connected reactors is used for production, it is further necessary to regularly switch between different reactors, thereby having defects of complex production process and high labor costs.

In the present application, a continuous reaction system shown in FIG. 1 is used to prepare the ferromanganese phosphate precursor. In the continuous reaction system of the present application, the first reactor, the second reactor, and the aging reactor are interconnected in series, thereby ensuring continuous feeding and continuous discharging, and performing reactions in the plurality of reactors simultaneously. Therefore, the method for preparing a ferromanganese phosphate precursor provided in the present application has advantages such as high production efficiency, high energy efficiency, simple process, easy operations, and low labor costs, and is especially suitable for large-scale industrial production.

The ferromanganese phosphate precursor obtained through the existing intermittent preparation method still has the defects of large particle size, wide particle size distribution, irregular appearance, and low tap density, thereby affecting the fluidity, dispersibility, and processability of the product, and seriously hindering the practical application of the ferromanganese phosphate precursor in the lithium iron manganese phosphate.

The method for preparing a ferromanganese phosphate precursor provided in the present application is a continuous preparation method. In the continuous preparation process, the ferromanganese phosphate precursor particles stay for a same duration in the first reactor, the second reactor, and the aging reactor during growth. Therefore, compared with the ferromanganese phosphate precursor obtained through the existing intermittent preparation method, the ferromanganese phosphate precursor obtained through the continuous preparation method provided in the present application has advantages of small particle size, narrow particle size distribution, high crystallinity, monocrystal phase, regular appearance, high tap density, high batch stability, and high batch consistency.

The method for preparing a ferromanganese phosphate precursor provided in the present application is a hydrothermal method, and the ferromanganese phosphate precursor obtained through the preparation method provided in the present application has regular spherical appearance. The spherical appearance of the ferromanganese phosphate precursor can ensure that lithium ions can penetrate into the center of the ferromanganese phosphate precursor uniformly and synchronously from all directions through micropores on the surface of the spherical particles during subsequent sintering of the lithium iron manganese phosphate, and contributes to obtaining the lithium iron manganese phosphate with spherical appearance and uniform distribution of elements. In addition, compared with the ferromanganese phosphate precursor with irregular appearance prepared through existing technologies, the spherical ferromanganese phosphate precursor particles obtained through the continuous preparation method of the present application can further form a complete, uniform, and firm carbon cladding layer during subsequent sintering of the lithium iron manganese phosphate, so as to improve the conductivity of the resulting lithium iron manganese phosphate.

In the method for preparing a ferromanganese phosphate precursor provided in the present application, parameters such as the flow rate of the metal salt solution, the flow rate of the phosphorus source solution, the residence time of the ferromanganese phosphate precursor particles in each reactor during growth, and the reaction temperature in each reactor can be accurately adjusted, so that the preparation method provided in the present application further has good production flexibility.

The residence time of the ferromanganese phosphate precursor particles during growth in each of the first reactor, the second reactor, and the aging reactor is negatively correlated with the flow rate of the metal salt solution and the phosphorus source solution, and is positively correlated with the volume of each reactor. When the flow rate of the metal salt solution and the phosphorus source solution is high, the residence time of the ferromanganese phosphate precursor particles in each reactor is short; when the flow rate of the metal salt solution and the phosphorus source solution is low, the residence time of the ferromanganese phosphate precursor particles in each reactor is long; when the volume of each reactor is small, the residence time of the ferromanganese phosphate precursor particles in each reactor is short; and when the volume of each reactor is large, the residence time of the ferromanganese phosphate precursor particles in each reactor is long. Therefore, the flow rate of the metal salt solution and the phosphorus source solution and the volume of each reactor can be adjusted to regulate the particle size of the ferromanganese phosphate precursor.

The reaction temperature will also affect the particle size and the appearance of the resulting ferromanganese phosphate precursor particles. Therefore, the reaction temperature in each reactor can also be adjusted within different ranges to regulate the particle size and the appearance of the ferromanganese phosphate precursor.

Therefore, the method for preparing a ferromanganese phosphate precursor provided in the present application can further control the growth speed of crystal particles and regulate the size and the appearance of the crystal particles, thereby satisfying different production requirements to facilitate the preparation of the lithium iron manganese phosphate with different particle sizes.

In some examples, a complexing agent may also be added into the first dissolution reactor.

The ferromanganese phosphate precursor is prepared through conventional coprecipitation in the existing technologies, due to the difference in the precipitation speed of different metal ions, it is impossible to achieve uniform precipitation; and further, a molar ratio of each metal element in the resulting ferromanganese phosphate precursor particles is quite different from a molar ratio of each metal element in raw materials, thereby affecting the performance and consistency of the product. In addition, the ferromanganese phosphate precursor particles prepared through conventional coprecipitation in the existing technologies are usually irregular sheets or blocks, thus having a low tap density, affecting the fluidity, dispersibility, and processability of the product, and seriously hindering the practical application of the ferromanganese phosphate precursor in the lithium iron manganese phosphate.

The method for preparing a ferromanganese phosphate precursor provided in the present application is a hydrothermal method, and a complexing agent is also added into the first dissolution reactor in the preparation method provided in the present application. The complexing agent can complex metal ions to achieve the purpose of controlling free metal ions, thereby improving the conversion efficiency of metal ions, reducing the difference in reaction speed of different metal ions in the reaction mixture, and achieving uniform precipitation and crystallization. Therefore, when the complexing agent is also added into the first dissolution reactor, the spherical ferromanganese phosphate precursor particles with high purity, uniform distribution of metal elements, and high tap density can be obtained through the preparation method in the present application; and the molar ratio of each metal element in the spherical ferromanganese phosphate precursor particles obtained through the preparation method in the present application is less different from the molar ratio of each metal element in the raw materials, thereby further accurately controlling metal element contents.

Optionally, the complexing agent includes one or more of an aminocarboxylate, a hydroxycarboxylate, and an organic phosphonate. More optionally, the complexing agent includes one or more of sodium ammonium triacetate, disodium ethylenediamine tetraacetate, sodium gluconate, and sodium citrate.

A mass concentration of the complexing agent is optionally below 10 wt %, and is more optionally from 1 wt % to 10 wt %, based on a total mass of the metal salt solution.

In some examples, a surfactant may also be added into the first dissolution reactor, thereby contributing to better regulating the appearance of the ferromanganese phosphate precursor particles.

Optionally, the surfactant includes one or more of cetyltrimethylammonium bromide, sodium dodecanesulfonate, and polyvinylpyrrolidone.

A mass concentration of the surfactant is optionally below 5 wt %, and is more optionally from 1 wt % to 5 wt %, based on the total mass of the metal salt solution.

In some examples, a reaction temperature in the first reactor is lower than a reaction temperature in the second reactor, and a reaction temperature in the aging reactor is lower than the reaction temperature in the second reactor.

In the method for preparing a ferromanganese phosphate precursor provided in the present application, the first reactor, the second reactor, and the aging reactor are interconnected in series, and the reaction temperature in the first reactor and the aging reactor is set to be lower than the reaction temperature in the second reactor, so that different reactors in the continuous reaction system can mainly serve different functions. The reaction temperature in the first reactor is low, so that the metal salt solution and the phosphorus source solution are pre-mixed and pre-nucleated in the first reactor. In this case, the metal ions and phosphate ions tend to form a large number of crystal nuclei, thereby contributing to subsequent better crystallization and particle size distribution control in the second reactor. The reaction temperature in the second reactor is high, so that when the reaction mixture flows from the first reactor into the second reactor, the high reaction temperature not only can provide enough energy to promote the growth and crystallization of the crystal nuclei, but also can improve the crystallinity of the crystal nuclei on the premise of avoiding the aggregation and growth of the crystal nuclei. The reaction temperature in the aging reactor is lower than the reaction temperature in the second reactor. Therefore, when flowing from the second reactor into the aging reactor, the reaction mixture can function to cool the reaction mixture, so that unreacted raw materials in the reaction mixture can continue crystallization on the surface of the formed crystal particles, and the crystal particles continue growth to increase the size of the crystal particles and narrow the particle size distribution of the crystals.

Therefore, the reaction temperature in each reactor is adjusted not only to regulate a particle size of the resulting ferromanganese phosphate precursor, but also to contribute to obtaining the ferromanganese phosphate precursor particles with narrow particle size distribution, high crystallinity, monocrystal phase, regular appearance, and high tap density.

In some examples, optionally, the reaction temperature in the first reactor is from 70° C. to 90° C.

In some examples, optionally, the reaction temperature in the second reactor is from 150° C. to 250° C.

In some examples, optionally, the reaction temperature in the aging reactor is from 20° C. to 30° C.

In some examples, a flow rate of the metal salt solution (or a pumping speed of the first metering pump) in the first pipeline is from 0.2 L/min to 2 L/min, and is optionally from 0.25 L/min to 1 L/min.

In some examples, a flow rate of the phosphorus source solution (or a pumping speed of the second metering pump) in the second pipeline is from 0.2 L/min to 2 L/min, and is optionally from 0.25 L/min to 1 L/min.

In some examples, the flow rate of the metal salt solution is equal to the flow rate of the phosphorus source solution (i.e., the pumping speed of the first metering pump is equal to the pumping speed of the second metering pump), thereby contributing to improving the consistency of the resulting ferromanganese phosphate precursor particles.

In some examples, a residence time of the ferromanganese phosphate precursor in the first reactor during growth is from 1 h to 4 h.

In some examples, a residence time of the ferromanganese phosphate precursor in the second reactor during growth is from 1 h to 16 h, and is optionally from 4 h to 16 h.

In some examples, a residence time of the ferromanganese phosphate precursor in the aging reactor during growth is from 1 h to 48 h, and is optionally from 12 h to 48 h.

In some examples, a volume of the first reactor is less than or equal to a volume of the second reactor, so that the residence time of the ferromanganese phosphate precursor in the second reactor during growth is long, and so that the resulting ferromanganese phosphate precursor particles have higher crystallinity. A ratio of the volume of the first reactor to the volume of the second reactor is optionally 1:(1-4), and is more optionally 1:(2-4).

In some examples, the volume of the first reactor is less than or equal to a volume of the aging reactor, so that the residence time of the ferromanganese phosphate precursor in the aging reactor during growth is long, and so that the resulting ferromanganese phosphate precursor has a large particle size. A ratio of the volume of the first reactor to the volume of the aging reactor is optionally 1:(1-12), and is more optionally 1:(4-12).

In some examples, the volume of the second reactor is less than or equal to the volume of the aging reactor, so that the residence time of the ferromanganese phosphate precursor in the aging reactor during growth is long, and so that the resulting ferromanganese phosphate precursor has a large particle size. A ratio of the volume of the second reactor to the volume of the aging reactor is optionally 1:(1-3), and is more optionally 1:(2-3).

In some examples, in S3, a drying temperature is optionally from 200° C. to 300° C.

In some examples, in S3, a drying duration is optionally from 3 h to 8 h.

In some examples, in S3, the drying may be performed in a dryer, and a drying atmosphere is a protective gas atmosphere, where the protective gas includes nitrogen, an inert gas, or a combination thereof. Optionally, the inert gas includes helium, argon, or a combination thereof.

In some examples, the metal salt required for preparing the ferromanganese phosphate precursor includes a water-soluble iron salt, a water-soluble manganese salt, and an optional water-soluble salt of a doping element M, where M represents a manganese-doped and iron-doped element, optionally including one or more of Co, Mg, Zn, Ca, Ti, V, Ni, or Cr.

The water-soluble iron salt may be various existing water-soluble compounds comprising iron ions (e.g., ferrous ions or ferric ions), and optionally, the water-soluble iron salt includes one or more of ferrous chloride, ferrous nitrate, ferrous sulfate, ferrous acetate, ferric chloride, ferric nitrate, ferric sulfate, or ferric acetate.

The water-soluble manganese salt may be various existing water-soluble compounds comprising manganese ions (e.g., manganous ions), and optionally, the water-soluble manganese salt includes one or more of manganous chloride, manganous nitrate, manganous sulfate, or manganous acetate.

The water-soluble salt of the doping element M may be various existing water-soluble compounds comprising M ions, and optionally, the water-soluble salt of the doping element M includes one or more of a chloride, a nitrate, a sulfate, or an acetate of the doping element M.

In some examples, the phosphorus source required for preparing the ferromanganese phosphate precursor includes one or more of phosphoric acid or a water-soluble phosphate. Optionally, the water-soluble phosphate includes one or more of trisodium phosphate, tripotassium phosphate, ammonium monohydrogen phosphate, ammonium dihydrogen phosphate, and triammonium phosphate.

In some examples, the phosphorus source required for preparing the ferromanganese phosphate precursor may further include a water-soluble source of a doping element Q, where Q represents a phosphorus-doped element, optionally including one or more of B, S, Si, and N. In some examples, optionally, the source of the doping element Q includes one or more of a sulfate, a borate, a nitrate, or a silicate of the doping element Q.

In some examples, the metal salt solution is an aqueous metal salt solution obtained by, for example, sufficiently mixing the metal salt required for preparing the ferromanganese phosphate precursor with deionized water.

In some examples, the phosphorus source solution is an aqueous phosphorus source solution obtained by, for example, sufficiently mixing the oxidant and the phosphorus source with deionized water.

In some examples, the oxidant includes one or more of hydrogen peroxide, nitric acid, sodium hypochlorite, potassium hypochlorite, sodium chlorate, and potassium chlorate, and is optionally hydrogen peroxide.

In some examples, a concentration of the metal salt solution is from 0.5 mol/L to 2 mol/L, and is optionally from 0.5 mol/L to 1 mol/L.

In some examples, a concentration of the phosphorus source solution is from 0.5 mol/L to 2 mol/L, and is optionally from 0.5 mol/L to 1 mol/L.

Compared with the metal salt, excessive phosphorus source may be added. In some examples, a molar ratio of the metal salt to the phosphorus source is from 1:1 to 1:3.

Compared with the metal salt, excessive oxidant may be added. In some examples, a molar ratio of the metal salt to the oxidant is 1:(0.1-1.2), and is optionally 1:(0.5-0.6).

During the reaction, the first dissolution reactor, the second dissolution reactor, the first reactor, the second reactor, and the aging reactor each remain stirred. In some examples, a stirring speed in the first dissolution reactor is from 100 r/min to 500 r/min. In some examples, a stirring speed in the second dissolution reactor is from 100 r/min to 500 r/min. In some examples, a stirring speed in the first reactor is from 100 r/min to 500 r/min. In some examples, a stirring speed in the second reactor is from 100 r/min to 500 r/min. In some examples, a stirring speed in the aging reactor is from 100 r/min to 500 r/min.

During the reaction, the first dissolution reactor, the second dissolution reactor, the first reactor, the second reactor, and the aging reactor are each insufflated with a protective gas. In some examples, the protective gas includes nitrogen, an inert gas, or a combination thereof. Optionally, the inert gas includes helium, argon, or a combination thereof.

In the method for preparing a ferromanganese phosphate precursor provided in the present application, unless otherwise specifically stated, all raw materials are directly commercially available.

The third aspect of embodiments of the present application provides a ferromanganese phosphate precursor prepared through the preparation method in the second aspect of the embodiments of the present application, having a chemical formula $Fe_xMn_yM_{1-x-y}P_{1-m}Q_mO_4$, $0<x<1$, $0<y<1$, $0\leq 1-x-y<1$, $0\leq m\leq 0.1$, where M represents a manganese-doped and iron-doped element, optionally including one or more of Co, Mg, Zn, Ca, Ti, V, Ni, or Cr, Q represents a phosphorus-doped element, optionally including one or more of B, S, Si, and N, and the ferromanganese phosphate precursor is electroneutral.

The ferromanganese phosphate precursor provided in the present application is prepared through the method in the second aspect of the embodiments of the present application, thereby having advantages of small particle size, narrow particle size distribution, high crystallinity, monocrystal phase, regular appearance, high tap density, high batch stability, and high batch consistency.

In some examples, the ferromanganese phosphate precursor has a spherical appearance.

In some examples, the ferromanganese phosphate precursor is an orthorhombic crystal system with a space group of pmnb.

In some examples, volumetric particle sizes Dv90 and Dv50 of the ferromanganese phosphate precursor satisfy $1<Dv90/Dv50\leq 2$, and optionally $1.1\leq Dv90/Dv50\leq 1.7$.

In some examples, the volumetric particle size Dv50 of the ferromanganese phosphate precursor is from 1 μm to 10 μm, and is optionally from 2.5 μm to 6 μm.

In some examples, $0.2\leq x\leq 0.5$.

In some examples, $0.5\leq y\leq 0.8$.

In some examples, $1-x-y=0$; and in some other examples, $0<1-x-y\leq 0.05$.

In some examples, $m=0$; and in some other examples, $0<m\leq 0.05$.

The fourth aspect of embodiments of the present application provides a method for preparing a lithium iron manganese phosphate, at least including steps of: S10: sufficiently mixing the ferromanganese phosphate precursor prepared through the preparation method in the second aspect of the embodiments of the present application or the ferromanganese phosphate precursor in the third aspect of the embodiments of the present application with a lithium source, an optional source of a doping element N, and an optional source of a doping element R at a predetermined ratio to obtain mixed raw materials, where N represents a lithium-doped element, optionally including one or more of Zn, Al, Na, K, Mg, Nb, Mo, and W, and R represents an oxygen-doped element, optionally including one or more of S, F, Cl, and Br; and S20: sintering the mixed raw materials obtained in S10 to obtain the lithium iron manganese phosphate, where the lithium iron manganese phosphate has a chemical formula $Li_aN_bFe_xMn_yM_{1-x-y}P_{1-m}Q_mO_{4-n}R_n$, M represents a manganese-doped and iron-doped element, optionally including one or more of Co, Mg, Zn, Ca, Ti, V, Ni, or Cr, N represents a lithium-doped element, optionally including one or more of Zn, Al, Na, K, Mg, Nb, Mo, and W, Q represents a phosphorus-doped element, optionally including one or more of B, S, Si, and N, R represents an oxygen-doped element, optionally including one or more of S, F, Cl, and Br, $0.9\leq a\leq 1.1$, $0\leq b\leq 0.1$, optionally $0<b\leq 0.05$ and $0<x<1$, optionally $0.2\leq x\leq 0.5$ and $0<y<1$, optionally $0.5\leq y\leq 0.8$ and $0\leq 1-x-y<1$, optionally $0<1-x-y\leq 0.05$ and $0\leq m\leq 0.1$, optionally $0<m\leq 0.05$ and $0\leq n\leq 0.1$, and optionally $0<n\leq 0.05$, and the lithium iron manganese phosphate is electroneutral.

When the lithium iron manganese phosphate is prepared using the above ferromanganese phosphate precursor of the present application, lithium ions can penetrate into the center of the ferromanganese phosphate precursor uniformly and synchronously from all directions through micropores on the surface of the spherical lithium iron manganese phosphate particles during the sintering, thereby contributing to obtaining the lithium iron manganese phosphate with spherical appearance and uniform distribution of elements. Therefore, the preparation method of the present application enables the resulting lithium iron manganese phosphate to have excellent electrochemical performance.

In some examples, the lithium source may be a lithium-containing compound usable for preparing a positive electrode active material lithium iron manganese phosphate known in the art, for example, the lithium source includes one or more of $Li_2CO_3$, LiOH, $Li_3PO_4$, and $LiH_2PO_4$.

In some examples, the source of the doping element N includes one or more of a chloride, a nitrate, a sulfate, and an acetate of the doping element N.

In some examples, the source of the doping element R includes one or more of an elementary substance and an ammonium salt of the doping element R.

The source of each of the above doping elements is selected, thereby improving uniform distribution of each of the above doping elements, and improving the electrochemical performance of the lithium iron manganese phosphate.

In some examples, in S10, a carbon source may also be added into the mixed raw materials, so that a carbon-cladded lithium iron manganese phosphate can be prepared. When the lithium iron manganese phosphate is prepared using the above ferromanganese phosphate precursor of the present application, a complete, uniform, and firm carbon cladding layer can be further formed on the surface of the lithium iron manganese phosphate to improve conductivity of the resulting lithium iron manganese phosphate.

In some examples, the carbon source includes one or more an organic carbon source or an inorganic carbon source, and optionally includes a combination of one or more of glucose, sucrose, starch, fructose, polyvinyl alcohol, polyethylene glycol, and citric acid.

In the above preparation method, an addition amount of the source of each of the doping elements N and R depends on a target doping amount; and an addition amount of the lithium source satisfies a stoichiometric ratio of the lithium iron manganese phosphate. In some examples, the addition amount of the lithium source may also be slightly excessive, for example, may be from 100% to 110% of a theoretical mass of the lithium source. The theoretical mass of the lithium source refers to a mass of the lithium source computed according to the stoichiometric ratio of the lithium iron manganese phosphate.

In the above preparation method, unless otherwise specifically stated, all raw materials are directly commercially available.

The fifth aspect of embodiments of the present application provides a lithium iron manganese phosphate prepared through the method in the fourth aspect of the embodiments of the present application.

The lithium iron manganese phosphate has a chemical formula $Li_aN_bFe_xMn_yM_{1-x-y}P_{1-m}Q_mO_{4-n}R_n$, M represents a manganese-doped and iron-doped element, optionally including one or more of Co, Mg, Zn, Ca, Ti, V, Ni, or Cr, N represents a lithium-doped element, optionally including one or more of Zn, Al, Na, K, Mg, Nb, Mo, and W, Q represents a phosphorus-doped element, optionally including one or more of B, S, Si, and N, R represents an oxygen-doped element, optionally including one or more of S, F, Cl, and Br, $0.95 \le a \le 1.1$, $0 \le b \le 0.1$, optionally $0 < b \le 0.05$ and $0 < x < 1$, optionally $0.2 \le x \le 0.5$ and $0 < y < 1$, optionally $0.5 \le y \le 0.8$ and $0 \le 1-x-y < 1$, optionally $0 < 1-x-y \le 0.05$ and $0 \le m \le 0.1$, optionally $0 < m \le 0.05$ and $0 \le n \le 0.1$, and optionally $0 < n \le 0.05$, and the lithium iron manganese phosphate is electroneutral.

In some examples, the surface of the lithium iron manganese phosphate is also carbon-cladded, thereby improving conductivity of the lithium iron manganese phosphate.

The sixth aspect of embodiments of the present application provides a secondary battery, comprising the lithium iron manganese phosphate prepared through the method in the fourth aspect of the embodiments of the present application. The lithium iron manganese phosphate can be used in the secondary battery as a positive electrode active material, and also contributes to improving the electrochemical performance of the secondary battery.

EXAMPLES

The following examples describe the disclosure of the present application in more detail and are provided for illustrative purposes only, as various modifications and alterations within the scope of the disclosure of the present application will be apparent to those skilled in the art. Unless otherwise stated, all parts, percentages, and ratios reported in the following examples are on a mass basis; all reagents used in the examples are commercially available or can be synthesized according to conventional methods, and can be directly used without further treatment; and the instruments used in the examples are commercially available.

Example 1

A ferromanganese phosphate precursor was prepared using a continuous reaction system shown in FIG. 1.

A water-soluble manganous salt manganous chloride, a water-soluble ferrous salt ferrous chloride, and deionized water were added into a first dissolution reactor to prepare a metal salt solution at a concentration of 1 mol/L. In the metal salt solution thus prepared, a molar ratio of manganous ions to ferrous ions was 5:5. An oxidant hydrogen peroxide, a phosphorus source phosphoric acid, and deionized water were added into a second dissolution reactor to prepare a phosphorus source solution at a concentration of 1 mol/L, where a molar ratio of hydrogen peroxide to metal salt was controlled at (0.5-0.6):1.

As shown in FIG. 1, nitrogen is insufflated into each of the first dissolution reactor, the second dissolution reactor, a first reactor, a second reactor, and an aging reactor, and a stirring speed in each of them was 200 r/min during reaction. A reaction temperature in the first reactor was controlled at 90° C., a reaction temperature in the second reactor was controlled at 160° C., and a reaction temperature in the aging reactor was controlled at 25° C.

The metal salt solution and the phosphorus source solution were uninterruptedly pumped into the first reactor from the first dissolution reactor and the second dissolution reactor respectively through a stop valve and a metering pump, and were allowed to be mixed for reaction to generate a first reaction mixture, where a flow rate of the metal salt solution and a flow rate of the phosphorus source solution were each 0.5 L/min.

After reaction for 2 h, a liquid level of the first reaction mixture was higher than a first overflow port, and then the first reaction mixture automatically flowed out through the first overflow port to the second reactor for further reaction to generate a second reaction mixture.

After the reaction was continued for an additional 8 h, a liquid level of the second reaction mixture was higher than a second overflow port, and then the second reaction mixture automatically flowed out through the second overflow port to the aging reactor for further reaction to generate a third reaction mixture.

After the reaction was continued for an additional 24 h, a liquid level of the third reaction mixture was higher than a third overflow port, and then the third reaction mixture automatically flowed out through the third overflow port.

The resulting third reaction mixture was filtered and washed through a filter press, and then transferred into a dryer for drying in a nitrogen atmosphere at 200° C. for 6 h to remove water of crystallization, and finally obtain the ferromanganese phosphate precursor.

Example 2

A ferromanganese phosphate precursor was prepared using a continuous reaction system shown in FIG. 1.

A water-soluble manganous salt manganous nitrate, a water-soluble ferrous salt ferrous nitrate, a complexing agent sodium ammonium triacetate, and deionized water were added into a first dissolution reactor to prepare a metal salt solution at a concentration of 0.5 mol/L. In the metal salt solution thus prepared, a molar ratio of manganous ions to ferrous ions was 6:4, and a mass concentration of the complexing agent was 1 wt %. An oxidant hydrogen peroxide, a phosphorus source phosphoric acid, and deionized water were added into a second dissolution reactor to prepare a phosphorus source solution at a concentration of 0.5 mol/L, where a molar ratio of hydrogen peroxide to metal salt was controlled at (0.5-0.6):1.

As shown in FIG. 1, nitrogen is insufflated into each of the first dissolution reactor, the second dissolution reactor, a first reactor, a second reactor, and an aging reactor, and a stirring speed in each of them was 250 r/min during reaction. A reaction temperature in the first reactor was controlled at 80° C., a reaction temperature in the second reactor was controlled at 180° C., and a reaction temperature in the aging reactor was controlled at 25° C.

The metal salt solution and the phosphorus source solution were uninterruptedly transported to the first reactor from the first dissolution reactor and the second dissolution reactor respectively through a stop valve and a metering pump, and were allowed to be mixed for reaction to generate a first reaction mixture, where a flow rate of the metal salt solution and a flow rate of the phosphorus source solution were each 0.25 L/min.

After reaction for 4 h, a liquid level of the first reaction mixture was higher than a first overflow port, and then the first reaction mixture automatically flowed out through the first overflow port to the second reactor for further reaction to generate a second reaction mixture.

After the reaction was continued for an additional 16 h, a liquid level of the second reaction mixture was higher than a second overflow port, and then the second reaction mixture automatically flowed out through the second overflow port to the aging reactor for further reaction to generate a third reaction mixture.

After the reaction was continued for an additional 48 h, a liquid level of the third reaction mixture was higher than a third overflow port, and then the third reaction mixture automatically flowed out through the third overflow port.

The resulting third reaction mixture was filtered and washed through a filter press, and then transferred into a dryer for drying in a nitrogen atmosphere at 200° C. for 6 h to remove water of crystallization, and finally obtain the ferromanganese phosphate precursor.

Example 3

A ferromanganese phosphate precursor was prepared using a continuous reaction system shown in FIG. 1.

A water-soluble manganous salt manganous sulfate, a water-soluble ferrous salt ferrous sulfate, a water-soluble chromous salt chromous sulfate, a complexing agent disodium ethylenediamine tetraacetate, and deionized water were added into a first dissolution reactor to prepare a metal salt solution at a concentration of 1 mol/L. In the metal salt solution thus prepared, a molar ratio of manganous ions, ferrous ions, and chromous ions was 6.9:3:0.1, and a mass concentration of the complexing agent was 5 wt %. An oxidant hydrogen peroxide, a phosphorus source trisodium phosphate, and deionized water were added into a second dissolution reactor to prepare a phosphorus source solution at a concentration of 1 mol/L, where a molar ratio of hydrogen peroxide to metal salt was controlled at (0.5-0.6): 1.

As shown in FIG. 1, nitrogen is insufflated into each of the first dissolution reactor, the second dissolution reactor, a first reactor, a second reactor, and an aging reactor, and a stirring speed in each of them was 150 r/min during reaction. A reaction temperature in the first reactor was controlled at 90° C., a reaction temperature in the second reactor was controlled at 160° C., and a reaction temperature in the aging reactor was controlled at 25° C.

The metal salt solution and the phosphorus source solution were uninterruptedly transported to the first reactor from the first dissolution reactor and the second dissolution reactor respectively through a stop valve and a metering pump, and were allowed to be mixed for reaction to generate a first reaction mixture, where a flow rate of the metal salt solution and a flow rate of the phosphorus source solution were each 1 L/min.

After reaction for 1 h, a liquid level of the first reaction mixture was higher than a first overflow port, and then the first reaction mixture automatically flowed out through the first overflow port to the second reactor for further reaction to generate a second reaction mixture.

After the reaction was continued for an additional 4 h, a liquid level of the second reaction mixture was higher than a second overflow port, and then the second reaction mixture automatically flowed out through the second overflow port to the aging reactor for further reaction to generate a third reaction mixture.

After the reaction was continued for an additional 12 h, a liquid level of the third reaction mixture was higher than a third overflow port, and then the third reaction mixture automatically flowed out through the third overflow port.

The resulting third reaction mixture was filtered and washed through a filter press, and then transferred into a dryer for drying in a nitrogen atmosphere at 200° C. for 6 h to remove water of crystallization, and finally obtain the ferromanganese phosphate precursor.

Comparative Example 1

A water-soluble manganous salt manganous nitrate, a water-soluble ferrous salt ferrous nitrate, and deionized water were added into a first dissolution reactor to prepare a metal salt solution at a concentration of 0.5 mol/L. In the metal salt solution thus prepared, a molar ratio of manganous ions to ferrous ions was 6:4. An oxidant hydrogen peroxide, a phosphorus source phosphoric acid, and deionized water were added into a second dissolution reactor to prepare a phosphorus source solution at a concentration of 0.5 mol/L, where a molar ratio of hydrogen peroxide to metal salt was controlled at (0.5-0.6):1.

Both the metal salt solution and the phosphorus source solution were pumped into a reactor at a stirring speed of a metering pump of 0.25 r/min, nitrogen was insufflated into the reactor, rapid stirring was started at a stirring speed of 250 r/min, and the reactor was controlled at a temperature of 180° C. for a reaction duration of 20 h. After the reaction was complete, the mixture was naturally cooled from 180° C. to room temperature to obtain a slurry. The resulting slurry was discharged through a discharge port of the reactor, filtered and washed through a filter press, and then transferred into a dryer for drying in a nitrogen atmosphere at 200° C. for 6 h to remove water of crystallization, and finally obtain the ferromanganese phosphate precursor.

Comparative Example 2

A water-soluble manganous salt manganous nitrate, a water-soluble ferrous salt ferrous nitrate, a complexing agent sodium ammonium triacetate, and deionized water were added into a first dissolution reactor to prepare a metal salt solution at a concentration of 0.5 mol/L. In the metal salt solution thus prepared, a molar ratio of manganous ions to ferrous ions was 6:4, and a mass concentration of the complexing agent was 1 wt %. An oxidant hydrogen peroxide, a phosphorus source phosphoric acid, and deionized water were added into a second dissolution reactor to prepare a phosphorus source solution at a concentration of 0.5 mol/L, where a molar ratio of hydrogen peroxide to metal salt was controlled at (0.5-0.6):1.

Both the metal salt solution and the phosphorus source solution were pumped into a reactor at a stirring speed of a metering pump of 0.25 r/min, nitrogen was insufflated into the reactor, rapid stirring was started at a stirring speed of 250 r/min, and the reactor was controlled at a temperature of 180° C. for a reaction duration of 20 h. After the reaction was complete, the mixture was naturally cooled from 180° C. to room temperature to obtain a slurry. The resulting slurry was discharged through a discharge port of the reactor, filtered and washed through a filter press, and then transferred into a dryer for drying in a nitrogen atmosphere at 200° C. for 6 h to remove water of crystallization, and finally obtain the ferromanganese phosphate precursor.

Test (1) Testing of particle size: A volumetric particle size of the ferromanganese phosphate precursor prepared above was tested using Malvern Master Size 3000 laser particle size analyzer. Dv50 and Dv90 refer to corresponding particle sizes when a cumulative volume distribution percentage of a material reaches 50% and 90%. GB/T 19077-2016 may be referred to for the test.

(2) Testing of Mn/Fe molar ratio: The contents of manganese and iron elements in the ferromanganese phosphate precursor prepared above were tested by ICP-OES using Plasma 3000 inductively coupled plasma emission spectrometer, and their molar ratio was computed.

TABLE 1

| Serial No. | Dv50 | Dv90 | Dv90/Dv50 | Mn/Fe molar ratio Added value | Mn/Fe molar ratio Test value |
|---|---|---|---|---|---|
| Example 1 | 3.2 μm | 5.1 μm | 1.59 | 5:5 | 1.013:1 |
| Example 2 | 5.6 μm | 6.2 μm | 1.11 | 6:4 | 1.496:1 |
| Example 3 | 2.7 μm | 4.5 μm | 1.67 | 6.9:3 | 2.331:1 |
| Comparative Example 1 | 9.6 μm | 25.8 μm | 2.69 | 6:4 | 1.326:1 |
| Comparative Example 2 | 8.7 μm | 19.4 μm | 2.23 | 6:4 | 1.427:1 |

Figure 2:
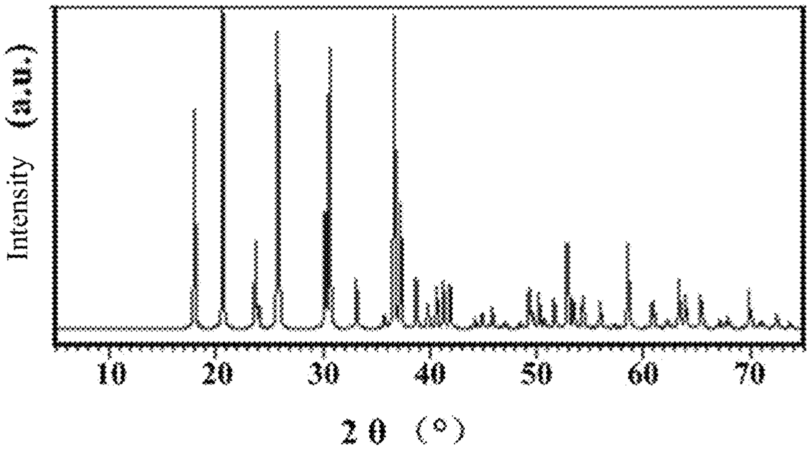
FIG. 2 shows an X-ray diffraction (XRD) pattern of the ferromanganese phosphate precursor prepared in Example 1.
Figure 3:
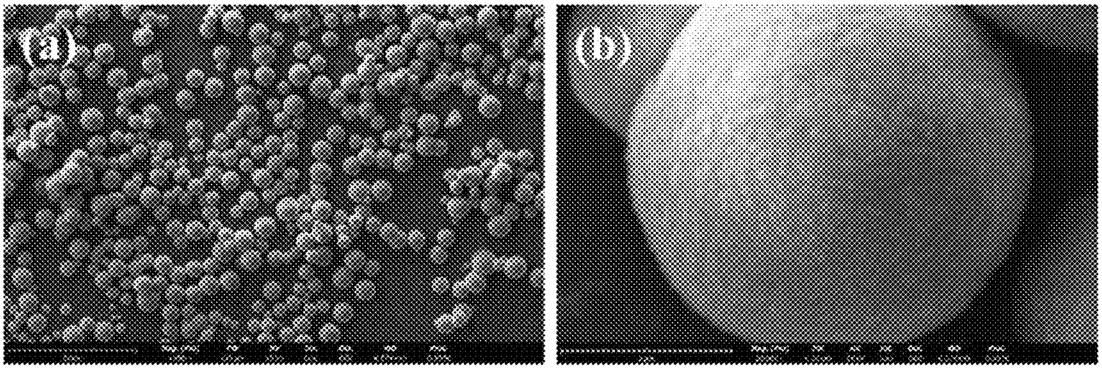
FIG. 3 shows a scanning electron microscope (SEM) image of the ferromanganese phosphate precursor prepared in Example 1. A magnification in FIG. 3(*a*) is 1,000, and a magnification in FIG. 3(*b*) is 20,000.
Figure 4:
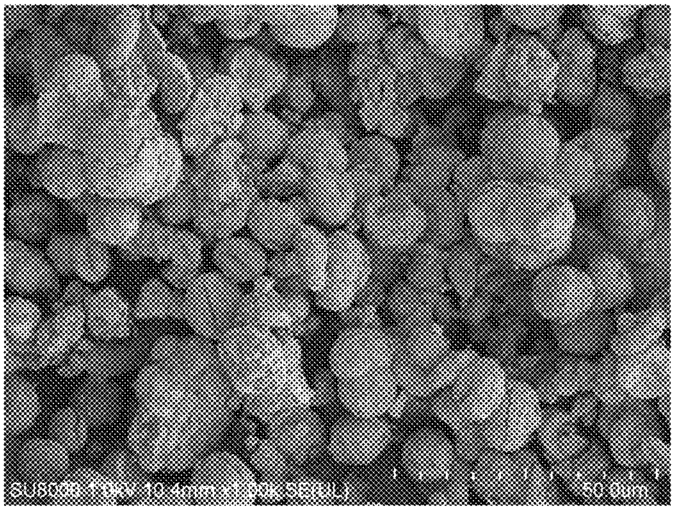
FIG. 4 shows a scanning electron microscope (SEM) image of the ferromanganese phosphate precursor prepared in Comparative Example 1 at a magnification of 1,000.
Figure 5:
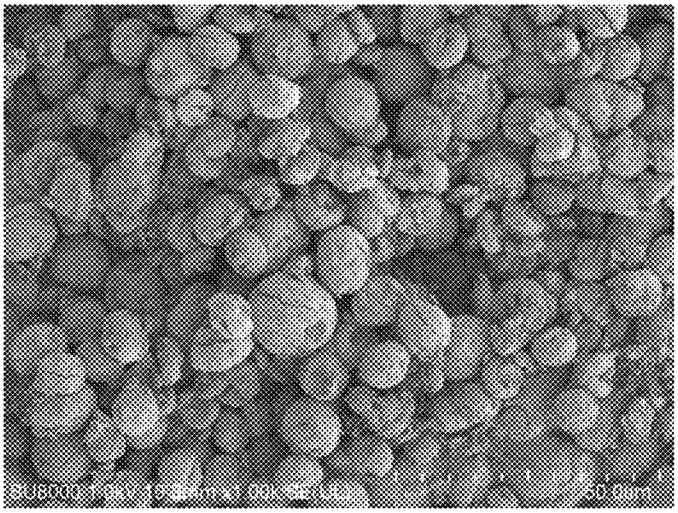
FIG. 5 shows a scanning electron microscope (SEM) image of the ferromanganese phosphate precursor prepared in Comparative Example 2 at a magnification of 1,000.

FIG. 2 shows an X-ray diffraction (XRD) pattern of the ferromanganese phosphate precursor prepared in Example 1. FIG. 3 shows a scanning electron microscope (SEM) image of the ferromanganese phosphate precursor prepared in Example 1. A magnification in FIG. 3(*a*) is 1,000, and a magnification in FIG. 3(*b*) is 20,000. FIG. 4 shows a scanning electron microscope (SEM) image of the ferromanganese phosphate precursor prepared in Comparative Example 1 at a magnification of 1,000. FIG. 5 shows a scanning electron microscope (SEM) image of the ferromanganese phosphate precursor prepared in Comparative Example 2 at a magnification of 1,000.

As can be seen from the test result in Table 1, FIG. 2, and FIG. 3, the ferromanganese phosphate precursor prepared through the continuous preparation method provided in the present application has advantages of small particle size, narrow particle size distribution, high crystallinity, monocrystal phase, and regular appearance.

As can be seen from the test result in Table 1, FIG. 4, and FIG. 5, the ferromanganese phosphate precursor prepared through the existing intermittent preparation method has large particle size, wide particle size distribution, and less regular appearance.

As can be seen from the test results of Example 2, Comparative Example 1, and Comparative Example 2, the Mn/Fe molar ratio in the ferromanganese phosphate precursor particles prepared through the continuous preparation method provided in the present application is less different from the Mn/Fe molar ratio in the metal salt solution, thereby accurately controlling the contents of manganese element and iron element.

As can be further seen from the test results of Example 2, and Comparative Example 1, and Comparative Example 2, the complexing agent contributed to further accurately controlling the contents of manganese element and iron element in the resulting ferromanganese phosphate precursor particles.

It should be noted that the present application is not limited to the above embodiments. The above embodiments are merely exemplary, and embodiments having substantially same technical concept and same effects within the scope of the technical solutions of the present application are all encompassed within the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

What is claimed is:

1. A method for preparing a ferromanganese phosphate precursor, the method comprising:

S1: connecting a first reactor, a second reactor, and an aging reactor in series through pipelines, wherein the first reactor includes a first feed port and a first overflow port, the first feed port of the first reactor is interconnected to a first dissolution reactor through a first pipeline, the first feed port of the first reactor is interconnected to a second dissolution reactor through a second pipeline, the first pipeline is provided with a first stop valve and a first metering pump, the second pipeline is provided with a second stop valve and a second metering pump, the second reactor includes a second feed port and a second overflow port, the second feed port of the second reactor is interconnected to the first overflow port of the first reactor through a third pipeline, the aging reactor includes a third feed port and a third overflow port, and the third feed port of the aging reactor is interconnected to the second overflow port of the second reactor through a fourth pipeline;

S2: adding a metal salt solution into the first dissolution reactor, adding an oxidant and a phosphorus source solution into the second dissolution reactor, pumping the metal salt solution in the first dissolution reactor into the first pipeline through the first stop valve and the first metering pump, pumping the phosphorus source solution in the second dissolution reactor into the second pipeline through the second stop valve and the second metering pump, allowing the metal salt solution and the phosphorus source solution to be mixed for reaction in the first reactor to generate a first reaction mixture, automatically transporting, when a liquid level of the first reaction mixture is higher than the first overflow port of the first reactor, the first reaction mixture to the second reactor for further reaction to generate a second reaction mixture, and automatically transporting, when a liquid level of the second reaction mixture is higher than the second overflow port of the second reactor, the second reaction mixture to the aging reactor for further reaction to generate a third reaction mixture, wherein, when a liquid level of the third reaction mixture is higher than the third overflow port of the aging reactor, the third reaction mixture automatically flows out through the third overflow port of the aging reactor, and during the reaction, the first dissolution reactor, the second dissolution reactor, the first reactor, the second reactor, and the aging reactor are each in a protective gas atmosphere, and each remains stirred, wherein the protective gas optionally includes nitrogen, an inert gas, or a combination thereof; and S3: filtering, washing, and drying the third reaction mixture obtained through the third overflow port of the aging reactor to obtain the ferromanganese phosphate precursor.

2. The preparation method according to claim 1, wherein a complexing agent is added into the first dissolution reactor.

3. The preparation method according to claim 1, wherein a surfactant is added into the first dissolution reactor, and wherein the surfactant includes one or more of cetyltrimethylammonium bromide, sodium dodecanesulfonate, and polyvinylpyrrolidone.

4. The preparation method according to claim 1, wherein a reaction temperature in the first reactor is lower than a reaction temperature in the second reactor, and a reaction temperature in the aging reactor is lower than the reaction temperature in the second reactor.

5. The preparation method according to claim 1, wherein a flow rate of the metal salt solution in the first pipeline is from 0.2 L/min to 2 L/min; and/or a flow rate of the phosphorus source solution in the second pipeline is from 0.2 L/min to 2 L/min; and/or the flow rate of the metal salt solution is equal to the flow rate of the phosphorus source solution.

6. The preparation method according to claim 1, wherein a residence time of the ferromanganese phosphate precursor in the first reactor during growth is from 1 h to 4 h; and/or a residence time of the ferromanganese phosphate precursor in the second reactor during growth is from 1 h to 16 h; and/or a residence time of the ferromanganese phosphate precursor in the aging reactor during growth is from 1 h to 48 h.

7. The preparation method according to claim 1, wherein a volume of the first reactor is less than or equal to a volume of the second reactor; and/or the volume of the first reactor is less than or equal to a volume of the aging reactor; and/or the volume of the second reactor is less than or equal to the volume of the aging reactor.

8. The preparation method according to claim 1, wherein the metal salt includes a water-soluble iron salt, a water-soluble manganese salt, and an optional water-soluble salt of a doping element M, wherein M represents a manganese-doped and iron-doped element, including one or more of Co, Mg, Zn, Ca, Ti, V, Ni, and Cr.

9. The preparation method according to claim 1, wherein the phosphorus source includes one or more of phosphoric acid or a water-soluble phosphate.

10. The preparation method according to claim 1, wherein the oxidant includes one or more of hydrogen peroxide, nitric acid, sodium hypochlorite, potassium hypochlorite, sodium chlorate, and potassium chlorate.

11. The preparation method according to claim 1, wherein a concentration of the metal salt solution is from 0.5 mol/L to 2 mol/L; and/or a concentration of the phosphorus source solution is from 0.5 mol/L to 2 mol/L; and/or a molar ratio of the metal salt to the phosphorus source is from 1:1 to 1:3.

12. The preparation method according to claim 1, wherein a stirring speed in the first dissolution reactor is from 100 r/min to 500 r/min; and/or a stirring speed in the second dissolution reactor is from 100 r/min to 500 r/min; and/or a stirring speed in the first reactor is from 100 r/min to 500 r/min; and/or a stirring speed in the second reactor is from 100 r/min to 500 r/min; and/or a stirring speed in the aging reactor is from 100 r/min to 500 r/min.

13. The preparation method according to claim 1, wherein in S3, a drying temperature is from 200° C. to 300° C.; and/or, in S3, a drying duration is from 3 h to 8 h; and/or, in S3, a drying atmosphere is a protective gas atmosphere, wherein the protective gas includes nitrogen, an inert gas, or a combination thereof.

14. The preparation method according to claim 1, wherein the ferromanganese phosphate precursor having a chemical formula $Fe_xMn_yM_{1-x-y}P_{1-m}Q_mO_4$, 0<x<1, 0<y<1, 0≤1-x-

$y<1$, and $0 \le m \le 0.1$, wherein M represents a manganese-doped and iron-doped element, including one or more of Co, Mg, Zn, Ca, Ti, V, Ni, or Cr, Q represents a phosphorus-doped element, including one or more of B, S, Si, and N, and the ferromanganese phosphate precursor is electroneutral.

15. The preparation method according to claim 14, wherein the ferromanganese phosphate precursor has a spherical appearance; and/or the ferromanganese phosphate precursor is an orthorhombic crystal system with a space group of pmnb.

16. The preparation method according to claim 14, wherein volumetric particle sizes Dv90 and Dv50 of the ferromanganese phosphate precursor satisfy $1<Dv90/Dv50 \le 2$; and/or the volumetric particle size Dv50 of the ferromanganese phosphate precursor is from 1 μm to 10 μm.

* * * * *